United States Patent [19]
Burenkov et al.

[11] 4,234,809
[45] Nov. 18, 1980

[54] ELECTROMAGNETIC BRAKE

[76] Inventors: Nikolai A. Burenkov, ulitsa Molostovykh, 2, korpus 2, kv. 54; Rikhard A. Ioganson, Kutuzovsky prospekt, 4, kv. 6; Mark B. Perchenok, ulitsa Chasovaya, 27/12, kv. 16; Alexandr V. Kuprianov, Chuxin tupik, 5, kv. 73; Evgeny V. Chegodaev, ulitsa Novgorodskaya, 34, kv. 317; Valentin I. Chulin, ulitsa Novo-Petrovskaya, 18, kv. 49, all of Moscow, U.S.S.R.

[21] Appl. No.: 929,440

[22] Filed: Jul. 31, 1978

[30] Foreign Application Priority Data

Aug. 31, 1977 [SU] U.S.S.R. ............... 2512802

[51] Int. Cl.³ .......................... H02K 49/02
[52] U.S. Cl. ...................... 310/105; 310/43; 310/54
[58] Field of Search ............. 310/54, 105, 93, 92, 310/43

[56] References Cited

U.S. PATENT DOCUMENTS 2,922,056  1/1960  Jaeschke ............ 310/54 X
3,863,083  1/1975  Jaeschke ............ 310/54 X

FOREIGN PATENT DOCUMENTS 1488525  9/1971  Fed. Rep. of Germany .

OTHER PUBLICATIONS

"Induction Brakes," Joganson, p. 64, Energya Pub. (Russ.), 1966.

Primary Examiner—Donovan F. Duggan
Attorney, Agent, or Firm—Fleit & Jacobson

[57] ABSTRACT

An electromagnetic brake comprising an exciting coil with a water-proofing means, disposed in an armature or a serrated inductor, a liquid cooling cavity embracing the exciting coil, and a support ring to which the exciting coil is attached. The supporting ring and the water-proofing means are made of nonconducting materials.

1 Claim, 1 Drawing Figure

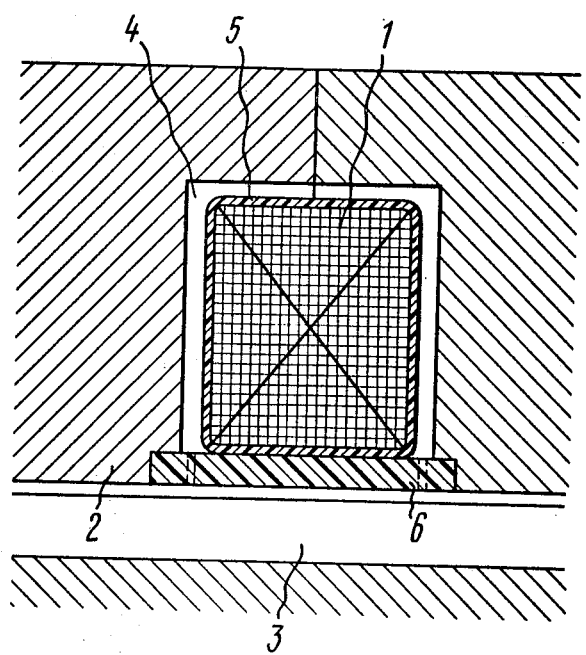

ELECTROMAGNETIC BRAKE

FIELD OF THE INVENTION

The invention relates to electromagnetic brakes with massive armatures, in which the operating force is obtained from eddy currents. The invention is applicable for use in testing various motors, transport machines, reducing gears and hydraulic clutches.

DESCRIPTION OF THE PRIOR ART

Known in the art are electromagnetic induction-type brakes with massive armatures, in which the exciting coil is fixed to a conducting body (cf. a brochure issued by the Schenck Company and presented at the "Electro-77" Fair). Such brakes are disadvantageous since eddy currents tend to pass through the supporting ring and water-proofing means of the exciting coil, which are made of conducting materials. This gives increased transient times during the changing of the braking torque.

Known in the art is an electromagnetic brake comprising an exciting coil with a water-proofing means, disposed in an armature or a serrated inductor, a liquid cooling cavity embracing the exciting coil, and a support ring to which the exciting coil is attached.

The exciting coil is disposed in a water-proofing brass casing and is attached to a brass support ring (cf. R. A. Ioganson, "Induction Brakes", Energya Publishers, p. 64, 1966).

In the described device, the eddy currents occurring in the brass support ring and the water-proofing brass casing tend to retard the rate of rise of the magnetic flux with the result that the time within which the brake settles is increased. The latter condition is not desirable for braking systems in which the simulation of rapid load variation is required.

SUMMARY OF THE INVENTION

An object of the invention is to provide for an increased rate of rise of the magnetic flux.

There is disclosed an electromagnetic brake comprising an exciting coil with a water-proofing means, disposed in an armature or a serrated inductor, a liquid cooling cavity embracing the exciting coil, and a support ring to which the exciting coil is attached, which electromagnetic brake comprises, according to the invention, the support ring and the water-proofing means made of nonconducting materials.

The electromagnetic brake of the invention provides for an increased rate of rise of the magnetic flux with the result that the time required for expensive field tests of transport machines is reduced.

DESCRIPTION OF THE INVENTION

The invention will now be described, by way of example, with reference to the accompanying drawing which shows a longitudinal section of an active portion of the electromagnetic brake, according to the invention.

The electromagnetic brake of the invention comprises an exciting coil 1 disposed in an armature 2 or a serrated inductor 3, a liquid cooling cavity 4 embracing the exciting coil 1, a nonconducting water-proofing means 5 for the exciting coil, and a nonconducting support ring 6 to which the exciting coil 1 is attached.

The electromagnetic brake of the invention operates as follows.

When the current through the exciting coil 1 changes, no current is produced in the water-proofing means 5 and the support ring 6. As a result, the water-proofing means 5 and the support ring 6 respond in no way to the variation of the magnetic flux, with the result that the transient becomes faster.

Since the water-proofing means 5 and the support ring 6 are made of nonconducting materials, the rate of rise of the magnetic flux is increased and the time required for expensive field tests of transport machines is reduced due to the fact that an adequate simulation of natural conditions can be achieved with a test bench.

In addition, this provides for an increased productivity of bench tests, decreased labor requirements and decreased time necessary for bench tests, with the result that the service life of the items being tested is increased.

A reduced test time results in fuel saving.

What is claimed is:

1. In an electromagnetic brake, comprising:
   an armature;
   a serrated inductor;
   a support ring;
   an exciting coil disposed in one of said armature and said serrated inductor and attached to said support ring;
   a water-proofing means for water-proofing said exciting coil; and
   a liquid cooling cavity embracing said exciting coil;
   the improvement wherein said support ring and said water-proofing means are non-conducting, whereby the production of current in said support ring and said water-proofing means during operation of said electromagnetic brake is precluded.

* * * * *